United States Patent
Sannodo (10) Patent No.: US 11,312,388 B2
(45) Date of Patent: Apr. 26, 2022

(54) AUTOMATIC PARKING DEVICE

(71) Applicant: TOYOTA JIDOSHA KABUSHIKI KAISHA, Toyota (JP)

(72) Inventor: Shinya Sannodo, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 85 days.

(21) Appl. No.: 15/868,262

(22) Filed: Jan. 11, 2018

(65) Prior Publication Data

US 2018/0257665 A1    Sep. 13, 2018

(30) Foreign Application Priority Data

Mar. 8, 2017    (JP) .............................. JP2017-044250

(51) Int. Cl.

| | |
|---|---|
| *B60W 30/06* | (2006.01) |
| *G05D 1/00* | (2006.01) |
| *B62D 6/00* | (2006.01) |
| *B60W 50/08* | (2020.01) |
| *B62D 15/02* | (2006.01) |

(52) U.S. Cl.
CPC .......... *B60W 50/082* (2013.01); *B60W 30/06* (2013.01); *B62D 15/0285* (2013.01); *B60W 2540/215* (2020.02); *B60W 2710/1005* (2013.01); *B60W 2710/20* (2013.01); *B60W 2720/10* (2013.01)

(58) Field of Classification Search
None
See application file for complete search history.

(56) References Cited

U.S. PATENT DOCUMENTS

| | | | | |
|---|---|---|---|---|
| 2006/0235590 | A1* | 10/2006 | Bolourchi | B62D 7/159 701/41 |
| 2007/0288145 | A1* | 12/2007 | Maeda | B62D 15/0285 701/41 |
| 2014/0121930 | A1 | 5/2014 | Allexi et al. | |
| 2014/0222252 | A1* | 8/2014 | Matters | B62D 15/027 701/2 |
| 2015/0375740 | A1* | 12/2015 | Okamura | B62D 15/0285 701/25 |

(Continued)

FOREIGN PATENT DOCUMENTS

| | | |
|---|---|---|
| DE | 10 2013 216 630 A1 | 5/2014 |
| DE | 10 2015 205 013 A1 | 11/2015 |

(Continued)

*Primary Examiner* — Adam D Tissot
*Assistant Examiner* — Laura E Linhardt
(74) *Attorney, Agent, or Firm* — Sughrue Mion, PLLC (57) ABSTRACT

An automatic parking device includes a vehicle control unit configured to control a speed, steering of the vehicle, and a shift range of a transmission of the vehicle in order to park the vehicle, a reception unit configured to receive a driving operation by a driver of the vehicle during the automatic parking by the vehicle control unit, and a determination unit configured to determine whether or not the driving operation received by the reception unit satisfies a predetermined override condition. The vehicle control unit stops the vehicle and sets the shift range of the transmission of the vehicle to a non-drive range in a case where it is determined by the determination unit that the driving operation satisfies the override condition.

8 Claims, 8 Drawing Sheets

(56) References Cited

U.S. PATENT DOCUMENTS

| | | | |
|---|---|---|---|
| 2016/0075375 A1 | 3/2016 | Yamashita et al. | |
| 2016/0153549 A1 | 6/2016 | Suzuki | |
| 2018/0157256 A1 | 6/2018 | Oniwa et al. | |

FOREIGN PATENT DOCUMENTS

| | | | |
|---|---|---|---|
| JP | 2007-331479 A | 12/2007 | |
| JP | 2016-7961 A | 1/2016 | |
| JP | 2016-060233 A | 4/2016 | |
| JP | 2016102540 A | 6/2016 | |
| JP | 2016150593 A | 8/2016 | |
| JP | 2016215751 A | 12/2016 | |
| KR | 10-1371478 B1 | 3/2014 | |
| WO | 2016181725 A1 | 11/2016 | |

\* cited by examiner

| DRIVING OPERATION | PARKING CONTROL | STATE WHEN INTERRUPTED |
|---|---|---|
| BRAKE PEDAL OPERATION | CONTINUED | — |
| ACCELERATOR PEDAL OPERATION | INTERRUPTION | STOP BY BRAKE CONTROL OPERATION |
| STEERING OPERATION | INTERRUPTION | STOP BY BRAKE CONTROL OPERATION |
| SHIFT LEVER OPERATION | INTERRUPTION | STOP BY BRAKE CONTROL OPERATION |
| BUTTON AND SWITCH OPERATION | INTERRUPTION | STOP BY BRAKE CONTROL OPERATION |

AUTOMATIC PARKING DEVICE

CROSS-REFERENCE TO RELATED APPLICATION

This application is based on Japanese Patent Application No. 2017-044250 filed with Japan Patent Office on Mar. 8, 2017, the entire contents of which are hereby incorporated by reference.

TECHNICAL FIELD

The present disclosure relates to an automatic parking device.

BACKGROUND

Japanese Unexamined Patent Publication No. 2007-331479 discloses an automatic parking device that automatically performs steering during parking. This device releases the automatic parking control when a driver's emergency brake operation is received during the automatic parking control. When a steering operation or a shift operation of a transmission is detected before the release of the emergency brake operation is detected, the device transfers the driving of the vehicle to the driver and supports the driver's steering using a steering assist force.

SUMMARY

In order to improve a convenience during parking, it is conceivable to improve the automatic parking device disclosed in Japanese Unexamined Patent Publication No. 2007-331479 such that not only the steering but also the shift range is automatically controlled. However, if the shift range is automatically controlled, when the driving of the vehicle is transferred to the driver, the shift range assumed by the driver may be different from the shift range of the vehicle. In this case, there is a concern that the driver may cause the vehicle to start at a shift range different from the assumed range. In this technical field, it is desired to avoid starting of the vehicle at a shift range different from the range assumed by the driver in the automatic parking in which the shift range is automatically controlled.

An aspect of the present disclosure provides an automatic parking device configured to perform automatic parking of a vehicle and to include a vehicle control unit configured to control a speed, steering of the vehicle, and a shift range of a transmission of the vehicle in order to park the vehicle, a reception unit configured to receive a driving operation by a driver of the vehicle during the automatic parking by the vehicle control unit, and a determination unit configured to determine whether or not the driving operation received by the reception unit satisfies a predetermined override condition. The vehicle control unit stops the vehicle and sets the shift range of the transmission of the vehicle to a non-drive range in a case where it is determined by the determination unit that the driving operation satisfies the override condition.

In the automatic parking device according to an embodiment, in a case where the override condition is satisfied during the automatic parking, the shift range of the transmission of the vehicle is set to the non-drive range, and thereafter, driving of the vehicle is transferred to the driver. Therefore, the device enables the driver to set the shift range again when starting the vehicle. Accordingly, according to the device, it is possible to avoid starting of the vehicle with a shift range different from the driver's assumption.

In an embodiment, the vehicle control unit may not set the shift range of the transmission of the vehicle to the non-drive range when the vehicle does not decelerate at the timing when the driving operation is received by the reception unit even in a case where it is determined by the determination unit that the driving operation satisfies the override condition.

The change of the shift range such as changing the traveling direction of the vehicle is performed when the vehicle reaches turning point and decelerates. Therefore, when the vehicle does not decelerate during the parking control, the change of the shift range such as changing the traveling direction of the vehicle is not performed. Therefore, according to the automatic parking device, the shift range of the transmission of the vehicle is not set to the non-drive range when the vehicle does not decelerate, and thus, it is possible to suppress the unnecessary change of the shift range.

According to the aspect or embodiment of the present disclosure, it is possible to avoid starting of the vehicle at the shift range different from the range assumed by the driver in the automatic parking in which the shift range is automatically controlled.

DETAILED DESCRIPTION

Hereinafter, exemplified embodiments will be described with reference to the drawings. In the description below, the same reference signs will be given to the same elements and the descriptions thereof will not be repeated.

First Embodiment

[Configuration of an Automatic Parking Device]

Figure 1:
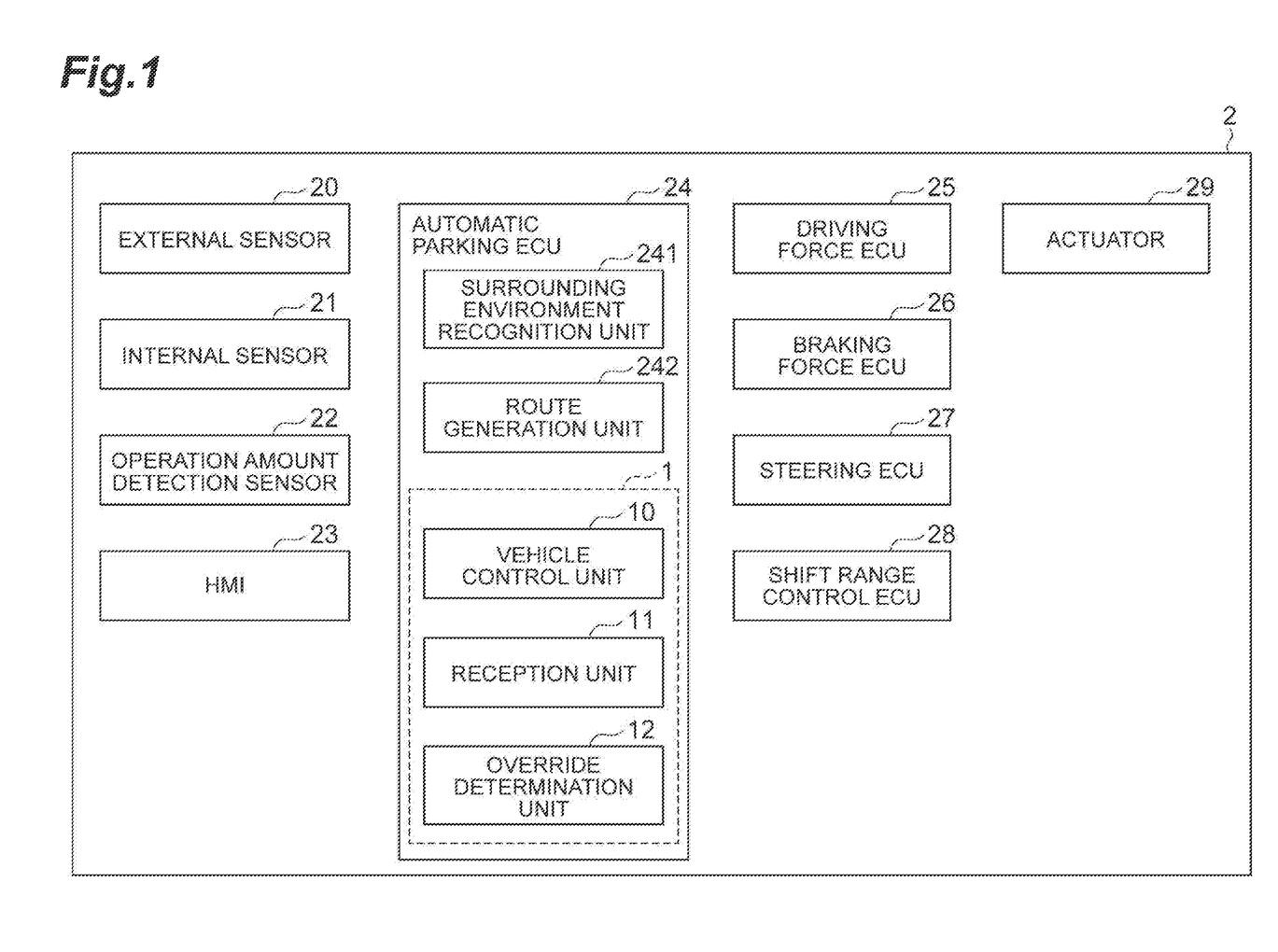
FIG. 1 is a block diagram illustrating a configuration of a vehicle that includes an automatic parking device in an embodiment.

FIG. 1 is a block diagram illustrating a configuration of a vehicle 2 that includes an automatic parking device 1 in an embodiment. As illustrated in FIG. 1, the automatic parking device 1 is mounted on the vehicle 2 such as a passenger car. The automatic parking device 1 automatically parks the vehicle 2 at a parking target position.

The vehicle 2 includes an external sensor 20, an internal sensor 21, an operation amount detection sensor 22, a human machine interface (HMI) 23, an electronic control unit (ECU) and an actuator 29. The ECU is an electronic control unit including a central processing unit (CPU), a read only memory (ROM), a random access memory (RAM), a controller area network (CAN) communication circuit, and the like. The vehicle 2 includes an automatic parking ECU 24, a driving force ECU 25, a braking force ECU 26, a steering ECU 27, and a shift range control ECU 28 as the ECUs.

The external sensor 20 is a detection device that detects a situation (i.g. environment) around the vehicle 2. The detection result of the external sensor 20 is output to the automatic parking ECU 24. As an example, the external sensor 20 includes at least one of a camera and a radar sensor.

The camera is an imaging device that images external situations of the vehicle 2. The camera may be provided on the inside of a windshield of the vehicle 2. The camera may be a monocular camera or may be a stereo camera.

The radar sensor is a detection device that detects an object around the vehicle 2 using a radio wave (for example, a millimeter wave) or light. The radar sensor includes, for example, millimeter wave radar or light detection and ranging (LIDAR). The radar sensor detects the object by transmitting the radio wave or the light to the surroundings of the vehicle 2 and receiving the radio wave or the light reflected from the object.

The internal sensor 21 is a detection device that detects a travelling state of the vehicle 2. The detection result of the internal sensor 21 is output to the automatic parking ECU 24. The internal sensor 21 includes at least a vehicle speed sensor.

The vehicle speed sensor is a detection device that detects the speed of vehicle 2. As the vehicle speed sensor, a vehicle wheel speed sensor is used, which is provided on vehicle wheels of the vehicle 2 or a drive shaft rotating integrally with the vehicle wheels, and detects a rotational speed of the vehicle wheels.

The internal sensor 21 may include an acceleration sensor or a yaw rate sensor. The acceleration sensor is a detection device that detects an acceleration of the vehicle 2. The acceleration sensor includes a longitudinal acceleration sensor that detects acceleration in the longitudinal direction of the vehicle 2 and a lateral acceleration sensor that detects lateral acceleration of the vehicle 2. The yaw rate sensor is a detection device that detects a yaw rate around the vertical axis of the center of gravity of the vehicle 2 (i.g. rotational angular velocity). As the yaw rate sensor, for example, a gyro sensor can be used.

The operation amount detection sensor 22 is a device that detects an operation amount of driver's driving operation of the vehicle 2. The detection result of the operation amount detection sensor 22 is output to the automatic parking ECU 24. The operation amount detection sensor 22 includes, for example, at least one of an accelerator pedal sensor and a steering sensor.

The accelerator pedal sensor is a detector that detects a depression amount of the accelerator pedal. The depression amount of the accelerator pedal is, for example, a position of the accelerator pedal (i.e. pedal position) with reference to a predetermined position. The accelerator pedal sensor is provided, for example, on a shaft portion of the accelerator pedal of the vehicle 2.

The steering sensor is a detector that detects a rotation state of the steering wheel. The detected value of the rotation state is, for example, a steering torque or a steering angle (an example of the operation amount of the steering operation). The steering sensor is provided on, for example, the steering shaft of the vehicle 2.

The operation amount detection sensor 22 may include a brake pedal sensor. The brake pedal sensor is a detector that detects a depression amount of the brake pedal. The brake pedal sensor may detect an operating force of the brake pedal (a depression force on the brake pedal, a pressure of the master cylinder, or the like).

The HMI 23 is an interface for performing output and input of information between the driver and the automatic parking device 1. The HMI 23 includes, for example, a display for displaying an image, a speaker for an audio output, and an operation button or a touch panel for the driver to perform the input operation. The operation button or the touch panel includes a start button for starting the automatic parking, a cancel switch (a cancel SW) for interrupting the automatic parking being executed, and a termination button for terminating interrupted automatic parking, and the like. The HMI 23 may use a terminal connected via wireless communication as an input/output terminal.

The automatic parking ECU 24 is main hardware configuring the automatic parking device 1, and is a calculation device that controls the automatic parking of the vehicle 2. The automatic parking ECU 24 is connected to a network that communicates using, for example, a CAN communication circuit, and is communicably connected to the above-described configuration elements of the vehicle 2. The automatic parking ECU 24 inputs and outputs data by operating the CAN communication circuit based on, for example, a signal output from the CPU, stores the input data in the RAM, loads the program stored in the ROM into the RAM, and executes the program loaded in the RAM, and then, realizes the function of the configuration elements of the automatic parking ECU 24 described later. The automatic parking ECU 24 may be configured with a plurality of electronic control units.

As the functions, the automatic parking ECU 24 includes a surrounding environment recognition unit 241, a route generation unit 242, a vehicle control unit 10 (an example of a vehicle control unit), a reception unit 11 (an example of a reception unit), and an override determination unit 12 (an example of a determination unit). The vehicle control unit 10, the reception unit 11, and the override determination unit 12 correspond to the main functions of the automatic parking device 1.

The surrounding environment recognition unit 241 recognizes the surrounding environment of the vehicle 2 based on the detection result of the external sensor 20. As an example, the surrounding environment recognition unit 241 recognizes a position of an object around the vehicle 2, a size and type of the object, a position of the road surface boundary line of a parking space, and the like.

The route generation unit 242 generates a route of the vehicle 2 for the automatic parking using the recognition result of the surrounding environment recognition unit 241. The route generation unit 242 generates a route, for example, from the current position of the vehicle 2 to a parking position in the target parking space. The target parking space is a parking space where the vehicle 2 is automatically parked. As an example, the route generation unit 242 sets the target parking space based on the input result of the HMI 23. Alternatively, the route generation unit 242 may recognize an empty parking space as the target parking space.

The route generation unit 242 generates a route (e.g. trajectory) to stop the vehicle 2 in the target parking space without coming in contact with the object based on the position relationship between the vehicle 2 and the target parking space and the position relationship between the vehicle 2 and the object, and the like. In the route generation processing, a well-known method such as geometrical calculation can be adopted. The route may include a turning point in the traveling direction of the vehicle 2. In other words, the route may include a forwarding route and a backward route of the vehicle 2. In addition, a target speed corresponding to the position may be included in the route.

Figure 2:
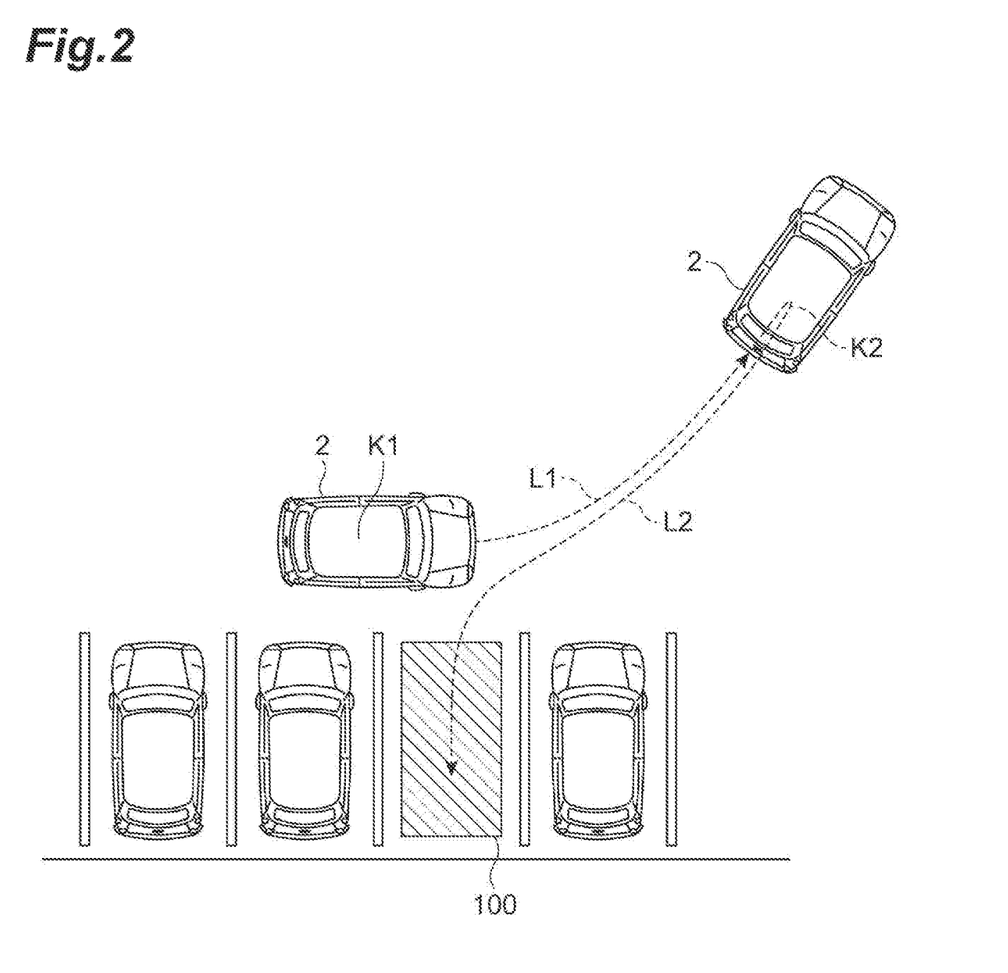
FIG. 2 is a diagram explaining an example of an automatic parking scene of the vehicle.

FIG. 2 is a diagram explaining an example of an automatic parking scene of the vehicle 2. The scene illustrated in FIG. 2 is a scene in Which the vehicle 2 performs automatic parking in the target parking space 100. The automatic parking device 11 starts the automatic parking when the vehicle 2 is at a position K1. The surrounding environment recognition unit 241 recognizes the empty space as the target parking space 100 based on the detection result of the external sensor 20. The route generation unit 242 grasps the positional relationship between the vehicle 2 and the target parking space 100 based on the detection result of the external sensor 20, and determines to park the vehicle 2 backward in the target parking space. Then, considering turning performance of the vehicle 2, a target route is generated. The target route includes a forward route L1 and a backward route L2, and the connection point of the route L1 and the route L2 becomes the direction change point K2.

In order to park the vehicle 2, the vehicle control unit 10 controls the speed and the steering of the vehicle 2, and the shift range of the transmission of the vehicle 2. The vehicle control unit 10 causes the vehicle 2 to travel along the route generated by the route generation unit 242.

The vehicle control unit 10 outputs signals to the driving force ECU 25 and the braking force ECU 26 to adjust the speed of the vehicle 2. As an example, the vehicle control unit 10 adjusts the speed of the vehicle 2 such that the difference between the target speed for each position and the speed of the vehicle 2 becomes small. The vehicle control unit 10 outputs a signal to the steering ECU 27 to adjust the steering of the vehicle 2. As an example, the vehicle control unit 10 adjusts the steering of the vehicle 2 so as to make a steering angle according to the shape of the route. The vehicle control unit 10 outputs a signal to the shift range control ECU 28 to adjust the shift range of the transmission of the vehicle 2. As an example, the vehicle control unit 10 adjusts the shift range of the transmission of the vehicle 2 such that a turning shift occurs at the direction change point K2 in the route.

The reception unit 11 receives the driver's driving operation of the vehicle 2 during the automatic parking by vehicle control unit 10. The driving operation is an operation by the driver for controlling the behavior of the vehicle 2. The driving operation includes an accelerator pedal operation, a brake pedal operation, a steering operation, a shift lever operation, a button operation of the HMI 23, a switch operation, and the like. The reception unit 11 receives the driving operation via the operation amount detection sensor 22 or the HMI 23.

The override determination unit 12 determines whether or not the driving operation received by the reception unit 11 satisfies a predetermined override condition. The driving operation to be determined by the override determination unit 12 is a driving operation other than the operation for decelerating the speed of the vehicle. That is, the driving operation to be determined is a driving operation other than the brake pedal operation, and for example, includes an accelerator pedal operation, a steering operation, a shift lever operation, a button operation of the HMI 23, a switch operation, and the like. For the brake pedal operation, the operation amount is reflected in the speed of the vehicle 2 during the automatic parking.

The override condition is set corresponding to the driving operation. For example, if the driving operation is a switch operation, the override condition is satisfied when the reception unit 11 receives an operation of the cancel switch of the HMI 23 which interrupts the automatic parking being executed. For example, in a case where the driving operation is a shift range change operation, the override condition is satisfied when the reception unit 11 receives an operation to change the shift range from "D" (forward) to "R" (backward) during the forward traveling of the vehicle 2. Alternatively, in a case where the driving operation is a shift range change operation, the override condition is satisfied when the reception unit 11 receives an operation to change the shift range from "R" (backward) to "D" (forward) during the backward travelling of the vehicle 2. In addition, in a case where the driving operation is the accelerator pedal operation, the override condition is satisfied when the operation amount of the accelerator pedal exceeding a threshold value is accepted. The driving operation and the override condition are stored in a storage unit of the ECU in association with each other. The override determination unit 12 can acquire the override condition corresponding to the driving operation referring to the storage unit. In a case where at least one driving operation satisfies the override condition, the override determination unit 12 determines that an override has been performed.

In a case where the override determination unit 12 determines that the override condition is satisfied, the vehicle control unit 10 stops the vehicle 2 and sets the shift range of the transmission of the vehicle 2 to a non-drive range. The vehicle control unit 10 outputs a request for setting the shift range to the non-drive range to the shift range control ECU 28. The non-drive range of the transmission is a state in which no power is transmitted to the tire of the vehicle 2. As an example, the non-drive range of the transmission is "P" (park) or "N" (neutral).

The vehicle control unit 10 operates in a plurality of control modes. The vehicle control unit 10 functions as a normal mode while controlling the speed, the steering, and the shift range of the transmission of the vehicle 2. In a case where the override determination unit 12 determines that the override condition is satisfied during the automatic parking, the control mode of the vehicle control unit 10 transits to an interruption mode from the normal mode. The interruption mode is a state in which automatic parking control is temporarily interrupted while automatic parking can resume. When the control mode transits from the normal mode to the interruption mode, the vehicle control unit 10 stores information on the calculated route, the position of the target parking space, the position of the vehicle 2 and the surrounding environment as the previous information in the ECU storage unit, or the like. Furthermore, the vehicle control unit 10 continues to monitor objects around the vehicle 2 and performs route recalculation in the background according to the positions of the objects. When the interruption mode is released and the control mode transits to the normal mode, the vehicle control unit 10 acquires the previous information and recalculation result referring to the storage unit. As described above, in the interruption mode, the vehicle control unit 10 loads the previous information and the recalculation result and reflects the information and the result on resuming the automatic parking.

Figure 3:
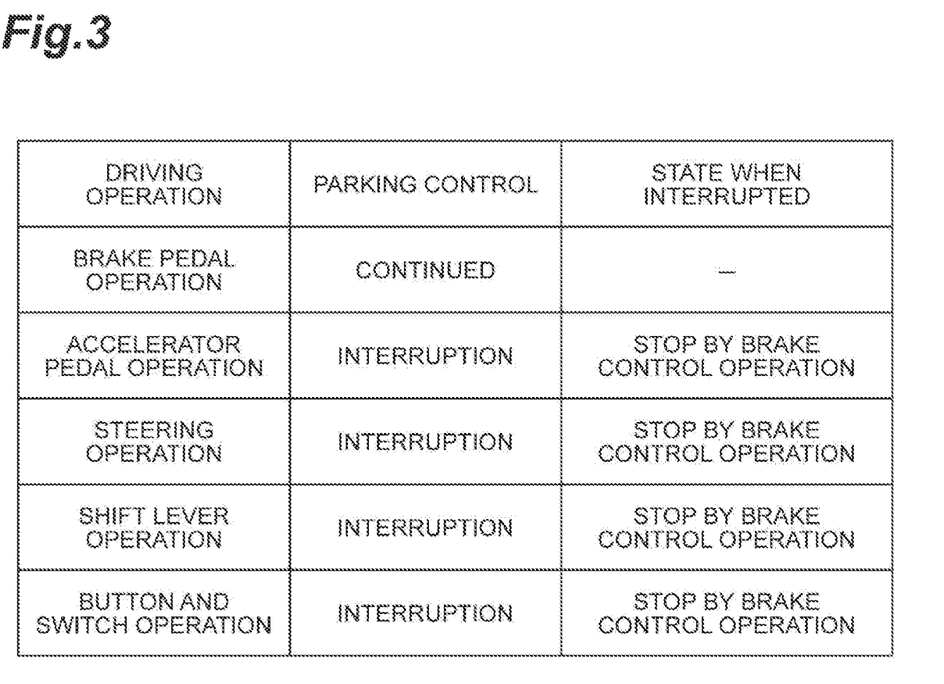
FIG. 3 is a table explaining an example of a relationship between driving operation and states of the parking control during the automatic parking.

FIG. 3 is a table explaining an example of a relationship between the driving operation and the states of the parking control during the automatic parking. As illustrated in FIG. 3, the vehicle control unit 10 continues the parking control in a case where the driving operation during automatic parking is the brake pedal operation. The vehicle control unit 10 operates in the normal mode and reflects the operation amount of the brake pedal operation on the speed of the vehicle 2 during the automatic parking. In a case where the driving operation during automatic parking is any of the accelerator pedal operation, the steering operation, the shift lever operation, and the button and switch operation, the vehicle control unit 10 interrupts the automatic parking. The vehicle control unit 10 stops the vehicle by the brake control and becomes the interruption mode (the shift range is the non-drive range). The vehicle control unit 10 may output the control result to the HMI 23. The control result is a control result relating to the automatic parking. The control result may include the automatic parking control mode.

Based on the driving operation during the interruption mode, the automatic parking ECU 24 determines any of the operations of resuming the automatic parking (transit to the normal mode), transfer of driving to the driver, or the automatic parking termination. In a case where the control mode transits to the interruption mode, the automatic parking ECU 24 determines the operation in consideration of the brake pedal operation as well. Details of the operation determination will be described later. In a case where resuming of the automatic parking is determined, the automatic parking ECU 24 loads the previous information and the recalculation result, and acquires the surrounding situation again, and then, resumes the automatic parking from the route on the way. In a case where the transfer of driving to the driver is determined, the automatic parking ECU 24 transfers the driving to the driver with the shift range "N" (neutral) as it is. In a case where the automatic parking is determined to be terminated, the automatic parking 24 changes the shift range to "P" (parking).

The driving force ECU 25 controls the driving force by operating the actuator 29 of the vehicle 2 based on the request from the automatic parking ECU 24. As an example, the actuator 29 operated by the driving force ECU 25 is a throttle actuator. The braking force ECU 26 controls the braking force by operating the actuator 29 of the vehicle 2 based on the request from the automatic parking ECU 24. As an example, the actuator 29 operated by the braking force ECU 26 is a brake actuator.

The steering ECU 27 controls the steering by operating the actuator 29 of the vehicle 2 based on the request from the automatic parking ECU 24. As an example, the actuator 29 operated by the steering ECU 27 is a steering actuator. The shift range control ECU 28 controls the shift range by operating the actuator 29 of the vehicle 2 based on the request from the automatic parking ECU 24. As an example, the actuator 29 operated by the steering ECU 27 is a shift range actuator.

[Operation of the Automatic Parking Device]

Figure 4:
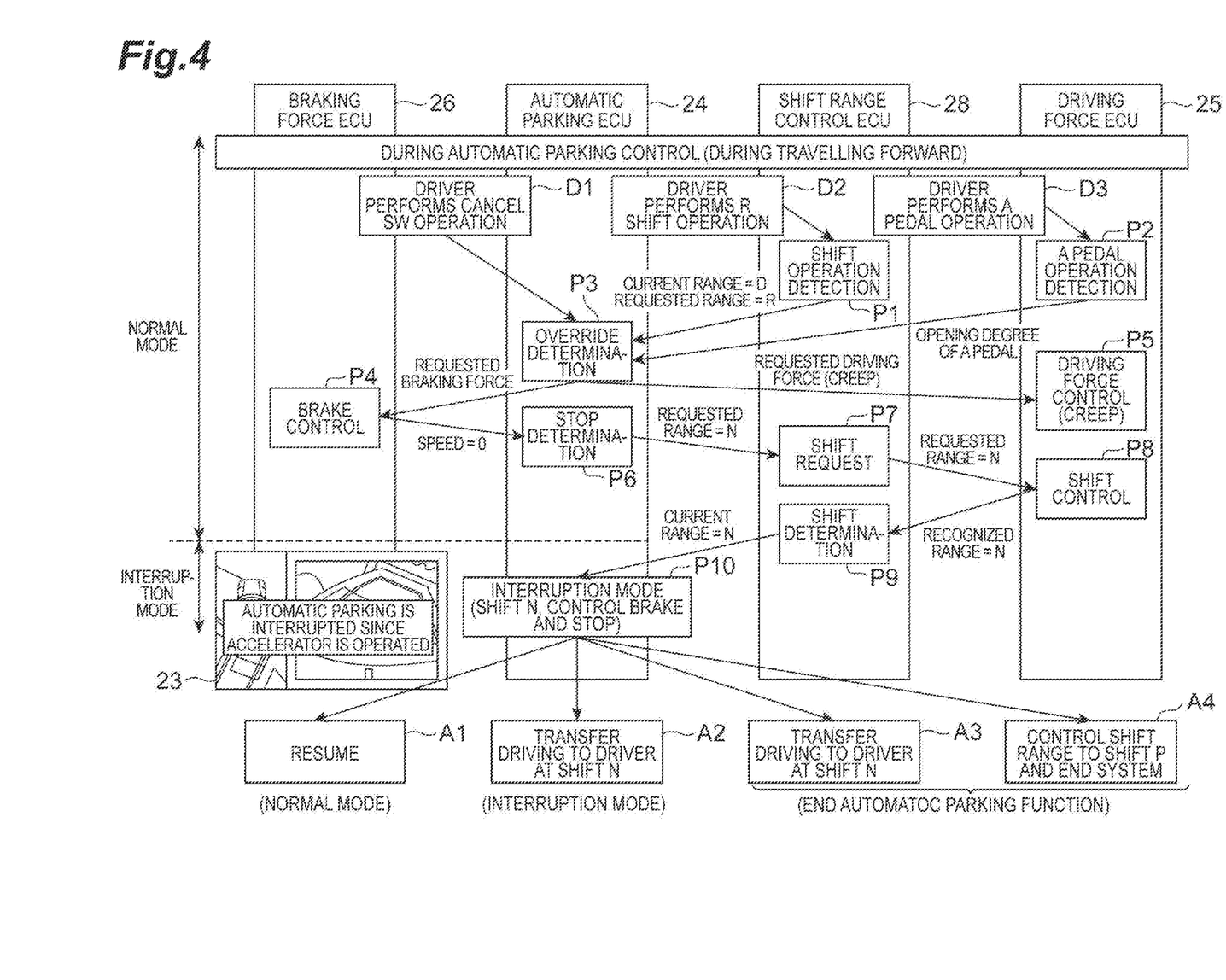
FIG. 4 is a diagram explaining an example of a cooperation between an automatic parking ECU and another ECU.

FIG. 4 is a diagram explaining an example of a cooperation between the automatic parking ECU 24 and another ECU. As illustrated in FIG. 4, the automatic parking interruption processing is performed by the automatic parking ECU 24 and the braking force ECU 26, the shift range control ECU 28 and the driving force ECU 25 exchanging the data. In FIG. 4, the operation when the vehicle 2 is traveling forward is described. In addition, as the driving operation during the automatic parking, the operation when any one of the button and switch operation, the shift lever operation, and the accelerator pedal operation is performed is described.

During the automatic parking, in a case where the driver performs an operation (a first operation D1) of turning on the cancel SW, the automatic parking ECU 24 receives the operation information and performs the override determination (processing P3). In a case where the operation information for turning on the cancel SW is received, the automatic parking ECU 24 determines that the override condition is satisfied.

During the automatic parking, in a case where the driver performs an operation (a second operation L2) of shifting the range to "R" (backward), the shift range control ECU 28 performs shift operation detection processing (processing P1). The shift range control ECU 28 outputs a current range "D" (forward) which is the current shift range and a requested range "R" (backward) which is the requested shift range, to the automatic parking ECU 24. The automatic parking ECU 24 receives the operation information and performs the override determination (processing P3). In a case where the operation to change the shift range from "D" (forward) to "R" (backward) is received, the automatic parking ECU 24 determines that the override condition is satisfied.

During the automatic parking, in a case where the driver performs the accelerator pedal operation (A pedal operation: a third operation D3), the driving force ECU 25 performs detection processing (processing P2) of the pedal operation. The driving force ECU 25 outputs an operation amount (opening degree) of the accelerator pedal to the automatic parking ECU 24. The automatic parking ECU 24 receives the operation amount and performs the override determination (processing P3). In a case where the operation amount is equal to or larger than the threshold value, the automatic parking ECU 24 determines that the override condition is satisfied.

In the override determination (processing P3), in a case where the override condition is satisfied, the automatic parking ECU 24 outputs the requested braking force to the braking force ECU 26. The braking force ECU 26 performs brake control (processing P4) based on the request and outputs the speed information to the automatic parking ECU 24. The automatic parking ECU 24 performs stop determination (processing P6) for determining whether or not the speed=0 based on the speed information.

After determining stop in the stop determination (processing P6), the automatic parking ECU 24 outputs "N" (neutral) to the shift range control ECU 28 as the requested range of the shift range. The shift range control ECU 28 performs processing (processing P7) for outputting "N" (neutral) to the driving force ECU 25 as the requested range. The driving force ECU 25 performs a shift control (processing P8) based on the requested range and outputs the recognized range "N" (neutral) which is the range being recognized, to the shift range control ECU 28. The shift range control ECU 28 compares the requested range with the recognized range and performs a shift determination (processing P9) for determining that the shift control has been performed. Subsequently, the shift range control ECU 28 outputs the current shift range "N" (neutral) to the automatic parking ECU 24.

When the shift range is "N" (neutral), the automatic parking ECU 24 determines that the mode has been shifted to the interruption mode (processing P10). The automatic parking ECU 24 causes the HMI 23 to display an indication that the automatic parking has been interrupted. In the drawing, an image notifying the driver that the automatic parking was interrupted due to the operation of the accelerator pedal is illustrated as an example.

The automatic parking ECU 24 causes the HMI 23 to display an "automatic parking resume" button, and an "automatic parking 110 termination" button during the interruption mode. In a case where the driver performs the brake pedal operation and presses the "automatic parking resume" button, the automatic parking ECU 24 resumes the automatic parking (state A1). In a case where the driver performs the brake pedal operation and also presses the "automatic parking termination" button, the automatic parking ECU 24 transfers the driving to the driver while continuing the interruption mode (state A2). The shift range at this time is "N" (neutral). In a case where the driver performs only the brake pedal operation, the automatic parking ECU 24 transfers the driving to the driver without continuing the interruption mode (state A3). The shift range at this time is "N" (neutral). In a case where the driver does not perform the driving operation for a predetermined time, the automatic parking ECU 24 terminates the automatic parking without continuing the interruption mode (state A4). At this time, the automatic parking ECU 24 sets the shift range to "P" (parking).

As described above, the automatic parking ECU 24 sets the shift range of the vehicle 2 to the non-drive range in a case where the override condition is satisfied. The operation when the vehicle 2 travels backward is the operation only with replacing "R" (backward) and "D" (forward) in FIG. 4 with each other, and other operations are the same.

[Flowchart for the Interruption Processing]

Figure 5:
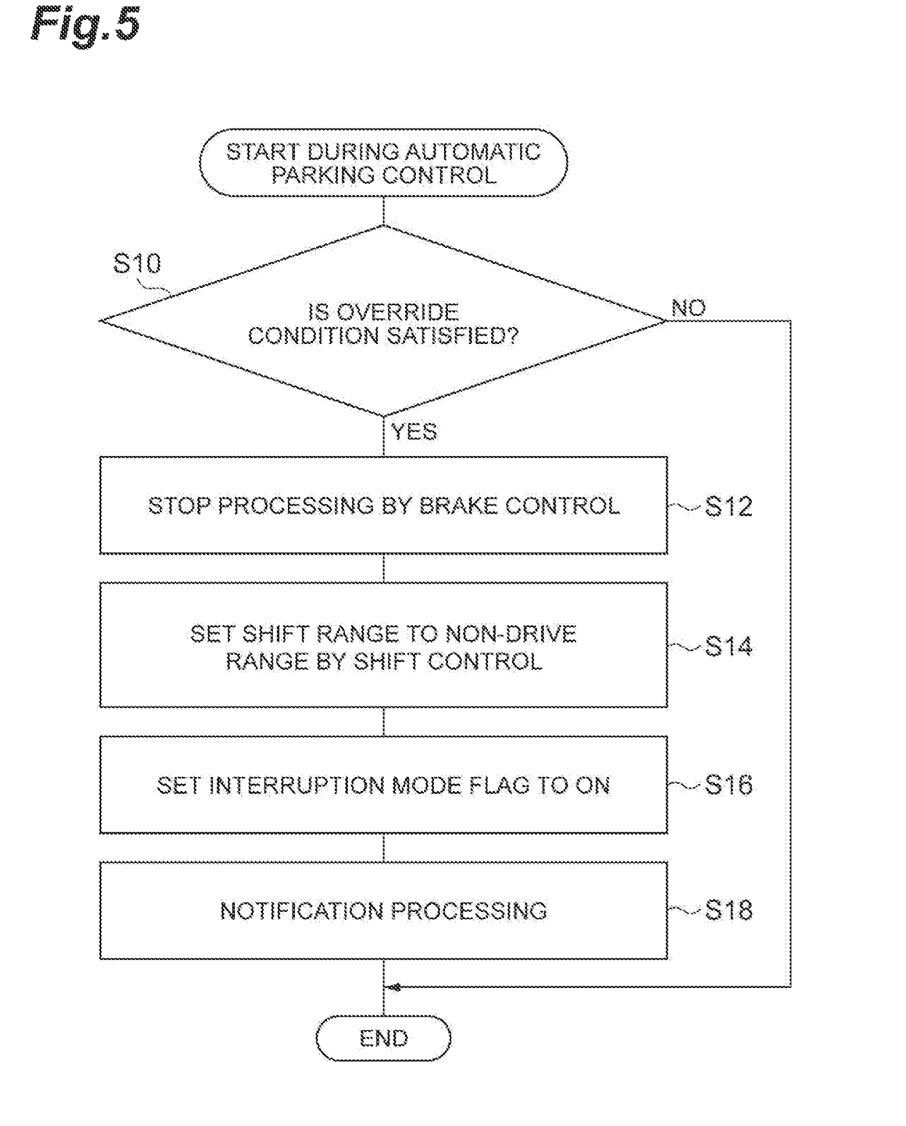
FIG. 5 is a flowchart explaining an example of an interruption processing.

FIG. 5 is a flowchart explaining an example of the interruption processing. The flowchart illustrated in FIG. 5 is started during the automatic parking control.

As illustrated in FIG. 5, as the determination processing (S10), the override determination unit 12 determines whether or not the override condition is satisfied. As an example, the override determination unit 12 determines whether or not the override condition corresponding to the driving operation received, by the reception unit 11 is satisfied.

In a case where it is determined that the override condition is satisfied (YES in S10), the vehicle control unit 10 performs the brake control as the stop processing (S12) and stops the vehicle 2. Subsequently, the vehicle control unit 10 sets the shift range of the transmission of the vehicle 2 to the non-drive range as the range setting processing (S14). Subsequently, the vehicle control unit 10 sets the interruption mode flag to ON (for example, "1") as flag setting processing (S16). The interruption mode flag is stored in the storage unit of the ECU and is turned "ON" in a case where the automatic parking control is interrupted, and is turned "OFF" otherwise. Subsequently, as notification processing (S18), the vehicle control unit 10 causes the 23 to display the indication that the control mode has become interruption mode.

In a case where it is determined that the override condition is not satisfied (NO in S10), and when the notification processing (S18) terminates, the interruption processing illustrated in FIG. 5 ends. In a case where the automatic parking control is performed, the vehicle control unit 10 performs the processing in the flowchart illustrated in FIG. 5 from the beginning.

[Flowchart for the Operation Determination Processing]

Figure 6:
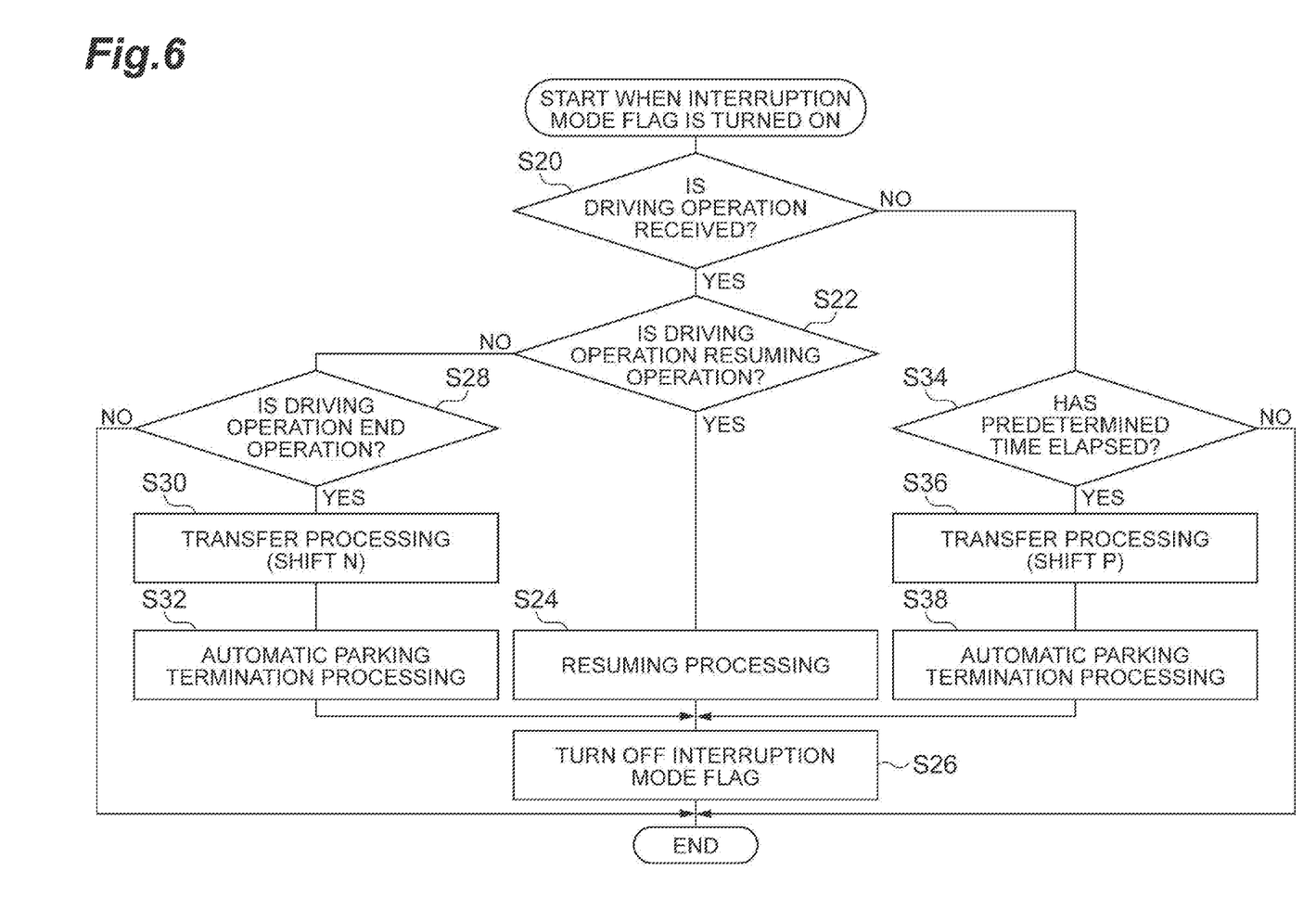
FIG. 6 is a flowchart explaining an example of operation determination processing after the interruption processing.

FIG. 6 is a flowchart explaining an example of the operation determination processing after the interruption processing. The flowchart illustrated in FIG. 6 starts in a case where the interruption mode flag is turned "ON".

As illustrated in FIG. 6, as determination processing (S20), the reception unit 11 of the automatic parking device 1 determines whether or not a driving operation is received. The driving operation here also includes a brake pedal operation.

In a case where it is determined that the driving operation is received (YES in S20), as the determination processing (S22), the vehicle control unit 10 of the automatic parking device 1 determines whether or not the driving operation is a resuming operation. The resuming operation is a driving operation for shifting the control mode to the normal mode from the interruption mode. As an example, the resuming operation is a combination of the brake pedal operation and the pressing operation of an "automatic parking resuming" button.

In a case where it is determined that the driving operation is the resuming operation (YES in S22), as resuming processing (S24), the vehicle control unit 10 shifts the control mode to the normal mode from the interruption mode. That is, the vehicle control unit 10 loads the previous information and the recalculation result, and acquires the surrounding situation again, and then, resumes the automatic parking from the route on the way.

In a case where it is determined that the driving operation is not the resuming operation (NO in S22), as the determination processing (S28), the vehicle control unit 10 determines whether or not the driving operation is a termination operation. The termination operation is a driving operation for terminating the automatic parking. As an example, the termination operation is only the brake pedal operation, or a combination of the brake pedal operation and the pressing operation of the "automatic parking termination" button.

In a case where it is determined that the driving operation is the termination operation (YES in S28), as transfer processing (S30), the vehicle control unit 10 transfers the driving to the driver while leaving the shift range "N" (neutral) as it is. For example, the vehicle control unit 10 causes the HMI 23 to display an indication that the automatic parking control is to be terminated, and thereafter, the driver will drive the vehicle. Subsequently, the vehicle control unit 10 performs discarding the calculation result on the way and the like as the termination processing (S32).

On the other hand, in a case where it is determined that the driving operation is not received (NO in S20), as the determination processing (S34), the vehicle control unit 10 of the automatic parking device 11 determines whether or not a predetermined time has elapsed from the start of the interruption mode.

In a case where it is determined that the predetermined time has elapsed from the start of the interruption mode (YES S34), as the transfer processing (S36), the vehicle control unit 10 sets the shift range to "P" (parking), and transfers the driving to the driver. For example, the vehicle control unit 10 causes the HMI 23 to display an indication that the automatic parking control is to be terminated, and thereafter, the driver will drive the vehicle. Subsequently, the vehicle control unit 10 performs discarding the calculation result on the way and the like as the termination processing (S38).

When the resuming processing (S24) or the termination processing (S32 and S38) is ended, as flag reset processing (S26), the vehicle control unit 10 sets the interruption mode flag to "OFF".

In a case where it is determined that the driving operation is not the termination operation (NO in S28), and in a case where it is determined that the predetermined time has not elapsed from the start of the interruption mode (NO in S34) or in a case where the flag reset processing (S26) is ended, the operation determination processing illustrated in FIG. 6 ends. After the end, if the interruption mode flag is turned "ON", the operation determination processing illustrated in FIG. 6 is performed from the beginning.

[Operation Effects of the First Embodiment]

As described above, according to the automatic parking device 1 in the first embodiment, in a case where override condition is satisfied during automatic parking, the shift range of the transmission of the vehicle 2 is set to "N" (neutral), and thereafter, the driving of the vehicle 2 is transferred to the driver. Therefore, the device enables the driver to set the shift range again when starting the vehicle 2. Accordingly, according to the device, it is possible to avoid starting of the vehicle 2 with a shift range different from the driver's assumption.

Second Embodiment

[Configuration of the Automatic Parking Device]

The configuration of the automatic parking device in a second embodiment is different from the configuration of the automatic parking device 1 in the first embodiment in a point that some functions of the vehicle control unit 10 are different, and others are the same. The configuration of the vehicle on which the automatic parking device in the second embodiment is mounted is the same as the vehicle 2 described in the first embodiment, Hereinafter, the overlapping description will not be repeated.

[Flowchart for Interruption Processing]

Figure 7:
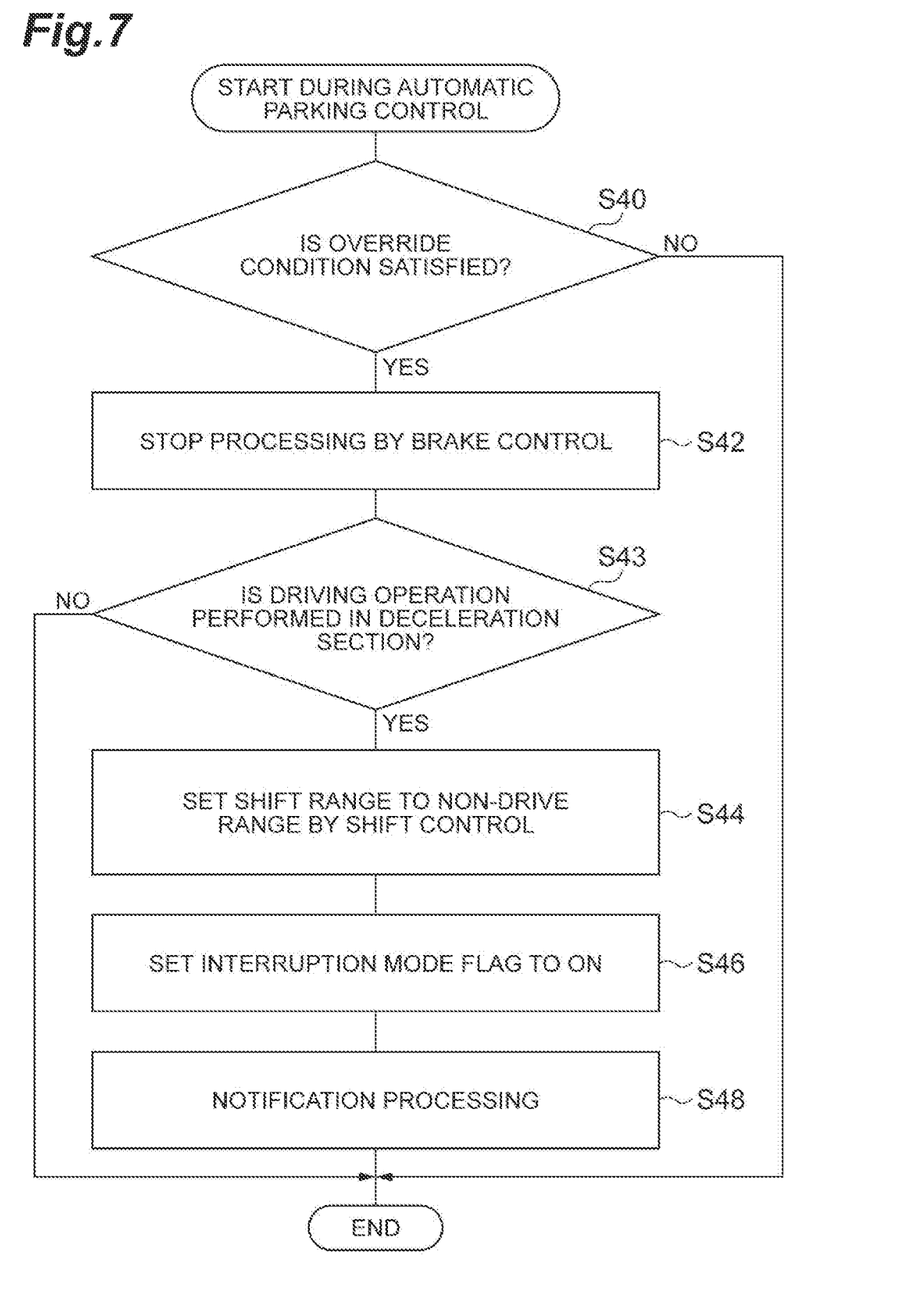
FIG. 7 is a flowchart explaining another example of the interruption processing.

FIG. 7 is a flowchart explaining an example of the interruption processing. The flowchart illustrated in FIG. 7 is started during the automatic parking control.

Determination processing (S40), stop processing (S42), range setting processing (S44), flag setting processing (S46), and notification processing (S48) illustrated in FIG. 7 are the same as the determination processing (S10), the stop processing (S12), the range setting processing (S14), the flag setting processing (S16), and the notification processing (S18) illustrated in FIG. 5. In other words, compared with the interruption processing shown in FIG. 5, the only different point is that deceleration determination processing (S43) is inserted.

Figure 8:
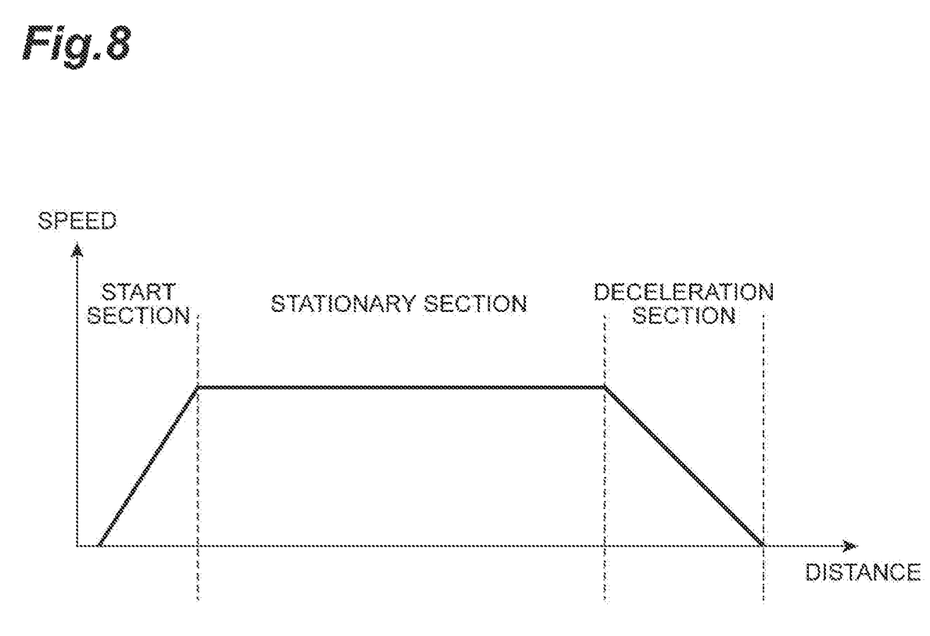
FIG. 8 is a diagram explaining an example of a speed pattern of the vehicle during the automatic parking.

As the deceleration determination processing (S43), the vehicle control unit 10 determines whether or not the driving operation is performed in the deceleration section. Specifically, the vehicle control unit 10 determines whether or not the vehicle 2 is decelerating at the timing when the driving operation is received by the reception unit 11. FIG. 8 is a diagram explaining an example of a speed pattern of the vehicle 2 during the automatic parking. In the graph of FIG. 8, the horizontal axis represents the distance and the vertical axis represents the speed. The speed pattern in FIG. 8 is the speed pattern in the route L1 of the parking scene described in FIG. 2. As illustrated in FIG. 8, as the vehicle 2 starts from the position K1 (FIG. 2) and the speed increases until the vehicle 2 travels a predetermined distance (start section). Thereafter, the vehicle 2 moves at a predetermined speed (stationary section). Since it is necessary to change the shift at the direction change point K2, the vehicle 2 decelerates in order to stop at the direction change point K2 (deceleration section). That is, the deceleration section is a section within the predetermined range of the direction change point K2.

In a case where it is determined that the driving operation is performed in the deceleration section (YES in S43), the process proceeds to the range setting processing (S44). On the other hand, in a case where it is determined that the driving operation is not performed in the deceleration section (NO in S43), the interruption processing illustrated in FIG. 7 ends.

[Operation Effects of the Second Embodiment]

The change of the shift range such as changing the traveling direction of vehicle 2 is performed when the vehicle 2 reaches direction change point K2 (when decelerates). In other words, when the vehicle 2 does not decelerate during the parking control, the change of the shift range such as changing the traveling direction of the vehicle 2 is not performed. According to the automatic parking device in the second embodiment, the shift range of the transmission of the vehicle 2 is not set to the non-drive range when the vehicle 2 does not decelerate, and thus, it is possible to suppress the unnecessary change of the shift range.

In the embodiments described above can be embodied in various modes with various modifications and improvements based on knowledge of those skilled in the art.

For example, in FIG. 6, as the determination processing (S28), the vehicle control unit 10 determines that the driving operation is the termination operation only at the time of only the brake pedal operation or when the combination of the brake pedal operation and the pressing operation of the "automatic parking termination" button, is received. However, the automatic parking processing may be changed "in a case where only the brake pedal operation is received", and "in a case where the combination of the brake pedal operation and the pressing operation of the "automatic parking termination" button, is received". For example, in a case where the driver performs the brake pedal operation and presses the "automatic parking termination" button, the automatic parking ECU 24 may transfer the driving to the driver while continuing the interruption mode" (state A2 in FIG. 4). In a case where the driver performs only the brake pedal operation, the automatic parking ECU 24 may transfer the driving to the driver without continuing the interruption mode (state A3 in FIG. 4).

For example, in the embodiments described above, the vehicle control unit 10 sets the shift range to the non-drive range after stopping the vehicle 2, but not limited thereto. For example, the vehicle control unit 10 may stop the vehicle 2 after setting the shift range to the non-drive range. Alternatively, the stop processing and the non-drive range setting processing may be performed simultaneously (in parallel).

In addition, in the embodiments described above, the shift range is set to "N" (neutral) in the interruption mode. However, the shift range may be set to "N" (neutral) after the transfer of the driving to the driver is fixed. For example, the shift range may be set to "N" (neutral) after it is fixed that the state becomes the state 42 and the state A3 in FIG. 4.

What is claimed is:

1. An automatic parking device comprising:
an electronic control unit (ECU) programmed to:
perform automatic parking of a vehicle without requiring a driving operation by the driver of the vehicle, including autonomously controlling a speed of the vehicle, steering of the vehicle, and a shift range of a transmission of the vehicle, wherein, during the automatic parking, the vehicle is autonomously controlled to park at a target parking position;
during the automatic parking, receive a driving operation performed by the driver on board the vehicle, wherein the driving operation performed by the driver controls behavior of the vehicle;
determine whether the driving operation received during the automatic parking satisfies a predetermined override condition, wherein the predetermined override condition is a condition for interrupting the automatic parking; and stop the vehicle and set the shift range of the transmission of the vehicle to a non-drive range in a case where it is determined that (i) the driving operation satisfies the predetermined override condition and (ii) the driving operation is performed within a predetermined area during a drive to a direction change point, wherein the direction change point is a point on a route to the target parking position, wherein the direction change point connects a forward target route and a backward target route, and wherein the predetermined area includes the direction change point and does not include the target parking position, wherein the ECU is further programmed to determine whether or not the vehicle is decelerating at a time when the driving operation is performed within the predetermined area.

2. The automatic parking device according to claim 1, wherein the ECU is further programmed to not set the shift range of the transmission of the vehicle to the non-drive range when (i) the vehicle does not decelerate and (ii) the driving operation is received, even in a case where the driving operation satisfies the predetermined override condition.

3. The automatic parking device according to claim 2, wherein the ECU is further programmed to not set the shift range of the transmission of the vehicle to the non-drive range when (i) the vehicle accelerates or travels at a constant speed and (ii) the driving operation is received, even in a case where the driving operation satisfies the predetermined override condition.

4. A method of automatically parking of a vehicle using an electronic control unit (ECU), comprising:
controlling, using the ECU, a speed of the vehicle, steering of the vehicle, and a shift range of a transmission of the vehicle in order to perform automatic parking of the vehicle without requiring a driving operation by the driver of the vehicle, wherein the automatic parking includes autonomously controlling a speed of the vehicle, steering of the vehicle, and a shift range of a transmission of the vehicle, and during the automatic parking, the vehicle is autonomously controlled to park at a target parking position;
during the automatic parking, receiving, using the ECU, a driving operation performed by the driver on board the vehicle, wherein the driving operation performed by the driver controls behavior of the vehicle;
determining, using the ECU, whether the driving operation received during the automatic parking satisfies a predetermined override condition, wherein the predetermined override condition is a condition for interrupting the automatic parking; and
stopping the vehicle and setting the shift range of the transmission of the vehicle to a nondrive range in a case where it is determined that (i) the driving operation satisfies the predetermined override condition and (ii) the driving operation is performed within a predetermined area during a drive to a direction change point, wherein the direction change point is a point on a route to the target parking position, wherein the direction change point connects a forward target route and a backward target route, and wherein the predetermined area includes the direction change point and does not include the target parking position,
further comprising determining whether or not the vehicle is decelerating at a time when the driving operation is performed within the predetermined area.

5. The automatic parking device according to claim 1, wherein the driving operation of the driver on board the vehicle includes at least one of: an accelerator pedal operation, a brake pedal operation, a steering operation, a shift lever operation, a button operation of a human-machine interface (HMI), or a switch operation that controls behavior of the vehicle.

6. The method of automatically parking the vehicle according to claim 4, further comprising: not setting the shift range of the transmission of the vehicle to the non-drive range when (i) the vehicle does not decelerate and (ii) the driving operation is received, even in a case where the driving operation satisfies the predetermined override condition.

7. The method of automatically parking the vehicle according to claim 6, further comprising:
not setting the shift range of the transmission of the vehicle to the non-drive range when (i) the vehicle accelerates or travels at a constant speed and (ii) the driving operation is received, even in a case where the driving operation satisfies the predetermined override condition.

8. The method of automatically parking the vehicle according to claim 4, wherein the driving operation of the driver on board the vehicle includes at least one of: an accelerator pedal operation, a brake pedal operation, a steering operation, a shift lever operation, a button operation of a human-machine interface (HMI), or a switch operation that controls behavior of the vehicle.

* * * * *